United States Patent
Stamey, Jr. et al.

(10) Patent No.: US 11,927,163 B2
(45) Date of Patent: *Mar. 12, 2024

(54) FILTER ELEMENT WITH AIR-BLEED CONDUIT

(71) Applicant: MANN+HUMMEL Filtration Technology US LLC, Gastonia, NC (US)

(72) Inventors: Willie L. Stamey, Jr., Kings Mountain, NC (US); Mark A. Roll, Bessemer City, NC (US); Gregory K. Rhyne, Stanely, NC (US)

(73) Assignee: MANN+HUMMEL Filtration Technology US LLC, Gastonia, NC (US)

( * ) Notice: Subject to any disclaimer, the term of this patent is extended or adjusted under 35 U.S.C. 154(b) by 385 days.

This patent is subject to a terminal disclaimer.

(21) Appl. No.: 17/336,943

(22) Filed: Jun. 2, 2021

(65) Prior Publication Data
US 2021/0355896 A1 Nov. 18, 2021

Related U.S. Application Data

(63) Continuation of application No. 14/885,022, filed on Oct. 16, 2015, now Pat. No. 11,035,330.

(51) Int. Cl.
*F02M 37/54* (2019.01)
*B01D 29/11* (2006.01)
(Continued)

(52) U.S. Cl.
CPC ............ *F02M 37/54* (2019.01); *B01D 29/111* (2013.01); *B01D 29/112* (2013.01); *B01D 29/21* (2013.01);
(Continued)

(58) Field of Classification Search
CPC ..... B01D 29/111; B01D 29/112; B01D 29/21; B01D 35/005; B01D 35/1475;
(Continued)

(56) References Cited

U.S. PATENT DOCUMENTS 3,167,507 A * 1/1965 Burhans ................. B01D 29/54
210/442
5,413,711 A * 5/1995 Janik ...................... B01D 27/08
210/438
(Continued)

FOREIGN PATENT DOCUMENTS

CN 203114577 U 8/2013
DE 102013020539 A1 6/2015
WO WO-2007140247 A2 12/2007

OTHER PUBLICATIONS

German Office Action for the related application No. 102016119505.7 dated Feb. 20, 2018.
(Continued)

*Primary Examiner* — Patrick Orme
(74) *Attorney, Agent, or Firm* — Honigman LLP

(57) ABSTRACT

A filter element includes a first end cap, a second end cap, and a ring of filter media disposed between the first end cap and the second end cap. The ring of filter media circumscribes a central cavity. The filter element also includes an air-bleed conduit axially extending through the central cavity. The air-bleed conduit includes a first portion integrally formed with the first end cap and a second portion integrally formed with the second end cap. The second portion is configured to fluidly connect to the first portion.

20 Claims, 5 Drawing Sheets

(51) Int. Cl.
  *B01D 29/21* (2006.01)
  *B01D 35/00* (2006.01)
  *B01D 35/147* (2006.01)
  *B01D 35/157* (2006.01)
  *B01D 36/00* (2006.01)
  *F02M 37/32* (2019.01)

(52) U.S. Cl.
  CPC ....... *B01D 35/005* (2013.01); *B01D 35/1475* (2013.01); *B01D 35/1576* (2013.01); *B01D 36/001* (2013.01); *F02M 37/32* (2019.01); *B01D 2201/291* (2013.01); *B01D 2201/305* (2013.01); *B01D 2201/316* (2013.01)

(58) Field of Classification Search
  CPC .............. B01D 35/1576; B01D 36/001; B01D 2201/291; B01D 2201/305; B01D 2201/316; F02M 37/32; F02M 37/54
  See application file for complete search history.

(56) References Cited

U.S. PATENT DOCUMENTS 10,807,026 B2 * 10/2020 Stamey, Jr. ............ B01D 29/15
11,035,330 B2 *  6/2021 Stamey, Jr. .......... B01D 35/005

OTHER PUBLICATIONS

Chinese Office Action for the related Application No. 201610903519.X dated Aug. 31, 2018 with its English translation thereof.
Non-Final Office Action dated Nov. 6, 2017, by the U.S. Patent and Trademark Office relating to U.S. Appl. No. 14/885,022.
Non-Final Office Action dated Jun. 12, 2018, by the U.S. Patent and Trademark Office relating to U.S. Appl. No. 14/885,022.
Final Office Action dated Jan. 23, 2019, by the U.S. Patent and Trademark Office relating to U.S. Appl. No. 14/885,022.
Non-Final Office Action dated May 7, 2019, by the U.S. Patent and Trademark Office relating to U.S. Appl. No. 14/885,022.
Ex-Parte Quayle Office Action dated Feb. 26, 2020, by the U.S. Patent and Trademark Office relating to U.S. Appl. No. 14/885,022.

* cited by examiner

FILTER ELEMENT WITH AIR-BLEED CONDUIT

TECHNICAL FIELD

This disclosure relates to fuel filter assemblies, and more particularly to a filter element of a filter assembly having an air-bleed conduit for venting air trapped within a filter housing of the filter assembly.

BACKGROUND

Filter assemblies may be used in fuel systems to remove particulates within a fuel stream between a fuel tank and an engine and/or other components. For example, a pump may move the fuel through the system from the fuel tank to the engine. The filter assembly may include a filter element disposed downstream of the pump to remove the particulates from the fuel prior to delivery to the engine and/or other downstream components. While changing filters, or during operation of the system, air may be introduced into the filter assembly. The air may create back pressure that inhibits the ability for unfiltered fuel to be pushed through the filter element for filtering. Additionally, the air may pass through the filter element, and consequently create erratic fuel delivery, thereby effecting performance of the downstream components.

It is known, to use vents or air passages for venting or bleeding out air within filter assemblies. Conventionally, these air passages are disposed radially outward of filter media and define vent openings spaced between inner surfaces of top and bottom end caps of the filter element. While locating the conventional air passages in this manner simplifies the ability to incorporate the air passages into the filter element during assembly, such air passages are ineffective for allowing air that has become trapped between the top end cap and the top of the filter housing to be vented out of the filter assembly.

SUMMARY

One aspect of the disclosure provides a filter element including a first end cap, a second end cap, a ring of filter media and an air-bleed conduit. The ring of filter media is disposed between the first end cap and the second end cap, and circumscribes a central cavity. The air-bleed conduit axially extends through the central cavity and includes a first portion integrally formed with the first end cap and a second portion integrally formed with the second end cap. The second portion is configured to fluidly connect to the first portion.

Implementations of the disclosure may include one or more of the following optional features. In some implementations, the sum of axial lengths of the first portion and the second portion is greater than an axial distance between the first end cap and the second end cap. The first portion may include an axial length greater than an axial distance between the first end cap and the second end cap. The second portion may fluidly connect to the first portion when a receiving passage defined by an inner surface of one of the first portion or the second portion receives an outer surface of the other one of the first portion or the second portion.

In some examples, the first portion axially extends from an inlet formed through the first end cap to a first distal end defining a distal opening in fluid communication with the inlet. The receiving passage may be defined by the inner surface of the second portion that axially extends between an outer opening formed through the second end cap and an inner opening defined by a second distal end of the second portion. The first distal end of the first portion may be disposed within the receiving passage of the second portion or axially extended through the outer opening formed through the second end cap when the first portion and the second portion are fluidly connected.

In some implementations, the outer surface of the first portion includes an exposed section axially extending from the first end cap, an insertion section at the first distal end and having an insertion diameter smaller than a diameter of the exposed section, and an intermediate frusto-conical section interconnecting the exposed section with the insertion section. The receiving passage may include a frusto-conical tapered section interconnecting the inner opening of the receiving passage with a uniform section of the receiving passage having a receiving diameter smaller than a diameter of the inner opening and greater than the insertion diameter of the insertion section of the first portion. The frusto-conical tapered section of the receiving passage may include a geometry configured to receive and seal against the intermediate frusto-conical section of the outer surface of the first portion to fluidly connect the second portion to the first portion when the uniform section of the receiving passage receives the insertion section of the first portion.

In some examples, the first portion axially extends from an inlet formed through the first end cap to a first distal end defining a first distal opening in fluid communication with the inlet, and the inner surface of the first portion defines the receiving passage extending axially from the first distal opening toward the inlet. The second portion may axially extend from an outer opening formed through the second end cap to a second distal end. The second distal end is disposed within the receiving passage of the first portion and defines an inner opening in fluid communication with the inlet formed through the first end cap and the outer opening formed through the second end cap when the first portion and the second portion are fluidly connected.

In some implementations, one or more interference members protrude radially inward from the inner surface of the first portion or protrude radially outward from the outer surface of the second portion. The filter element may further include one or more receiving slots formed within the other one of the inner surface of the first portion or the outer surface of the second portion and configured to receive corresponding one of the interference members to prevent the first portion and the second portion from moving relative to each other when the receiving passage of the first portion receives the outer surface of the second portion. The one or more interference members and the corresponding one or more receiving slots may cooperate to provide a seal within the receiving passage between the inner surface of the first portion and the outer surface of the second portion. The filter may also include a support core disposed in the central cavity of the filter media and supporting an inner periphery of the filter media, wherein the air-bleed conduit is disposed radially inward from the support core.

Another aspect of the disclosure provides a filter assembly including a filter housing and a filter element. The filter housing defines an internal chamber between a first end and a second end. The filter element is disposed within the internal chamber of the filter housing. The filter element includes a first end cap opposing the first end of the filter housing, a second end cap opposing the second end of the filter housing and a ring of filter media axially extending between the first end cap and the second end cap. The filter element further includes a male portion of an air-bleed conduit having a first proximal end integrally formed with the first end cap to define an inlet formed through the first end cap and a female portion of the air-bleed conduit fluidly connected to the first portion and having a second proximal end integrally formed with the second end cap to define an outer opening formed through the second end cap.

This aspect may include one or more of the following optional features. The male portion and the female portion may be coaxial and disposed radially inward from an inner periphery of the filter media. The female portion may define a receiving passage axially extending between the outer opening and an inner opening disposed between the first end cap and the second end cap. The receiving passage receives and forms a seal with an outer surface of the first portion. The male portion may axially extend from the first proximal end to a first distal end disposed within the receiving passage of the female portion. The first distal end defines a first distal opening that provides fluid communication between the inlet formed through the first end cap and the outer opening formed through the second end cap. The male portion may include a first distal end axially extending through the receiving passage of the female portion from the first proximal end. The first distal end may define a first distal opening disposed between the second end cap and the second end of the filter housing and in fluid communication with the inlet formed through the first end cap.

One or more interference members may protrude from one of the outer surface of the male portion or the inner surface of the receiving portion. One or more receiving slots may be formed within the other one of the outer surface of the male portion or the inner surface of the receiving portion and configured to receive corresponding ones of the interference members to prevent the male portion and the female portion from moving relative to each other.

Yet another aspect of the disclosure provides a method of manufacturing a filter element. The method includes integrally forming a first end cap with a first portion of an air-bleed conduit, the first portion axially extending from an inlet formed through the first end cap to a first distal end defining a first distal opening. The method further includes integrally forming a second end cap with a second portion of the air-bleed conduit, the second portion axially extending from an outer opening formed through the second end cap to a second distal end defining an inner opening. The method also includes providing a ring of filter media circumscribing a central cavity and extending axially between a first end and a second end and affixing one of the second end cap to the second end of the filter media of the first end cap to the first end of the filter media. The method further includes fluidly connecting the first portion and the second portion of the air-bleed conduit together and affixing the other one of the first end cap to the first end of the filter media or the second end cap to the second end of the filter media.

In some examples, the step of fluidly connecting the first portion and the second portion of the air-bleed conduit together includes, when the second end cap is affixed to the second end of the filter media with the second portion of the air-bleed conduit extending axially into the central cavity, positioning the first end cap to place the first portion of the air-bleed conduit in coaxial alignment with the second portion of the air-bleed conduit. The method may also include inserting one of the first distal end of the first portion into the inner opening of the second portion or the second distal end of the second portion into the first distal opening of the first portion and pressing the first portion and the second portion of the air-bleed conduit together to form a seal between an outer surface of the first portion and an inner surface of the second portion or between an inner surface of the first portion and an outer surface of the second portion.

In some implementations, the inlet formed through the first end cap directly fluidly communicates with one of the first distal opening of the first portion of the air-bleed conduit when the first distal end of the first portion extends through the outer opening formed through the second end cap. The inlet formed through the first end cap may further directly fluidly communicate with the outer opening formed through the second end cap when the first distal end of the first portion is disposed between the inner opening of the second portion and the outer opening.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
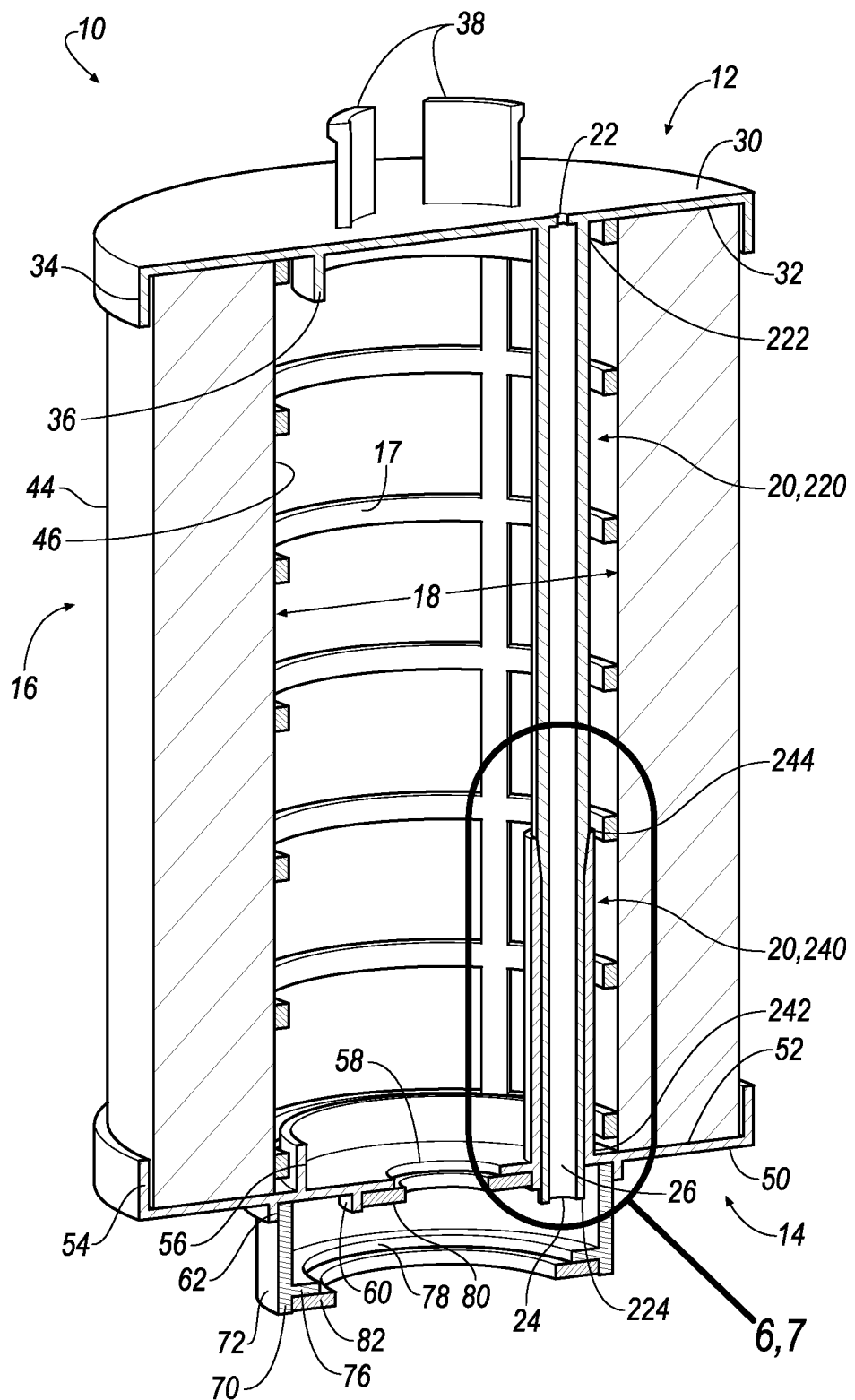
FIG. 1 is an isometric cross-sectional view of an example filter element having an air-bleed conduit.
Figure 2:
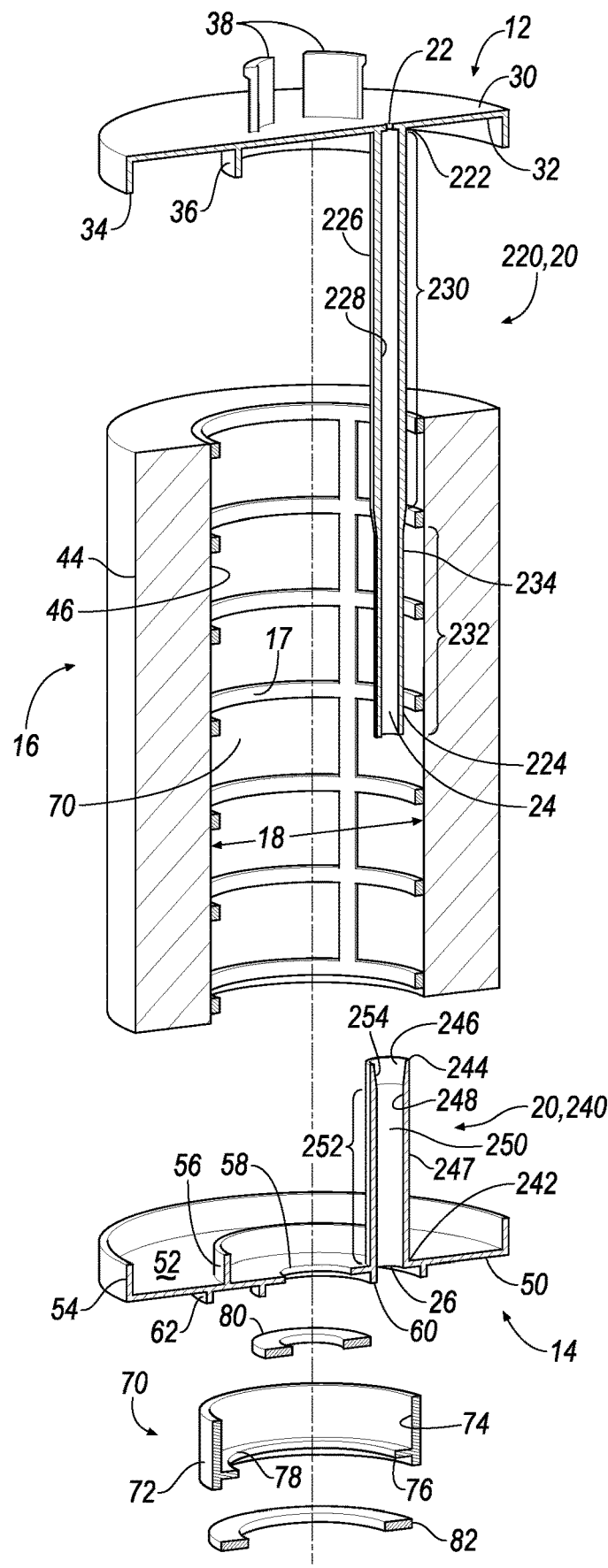
FIG. 2 is an exploded view of the filter element of FIG. 1.
Figure 3:
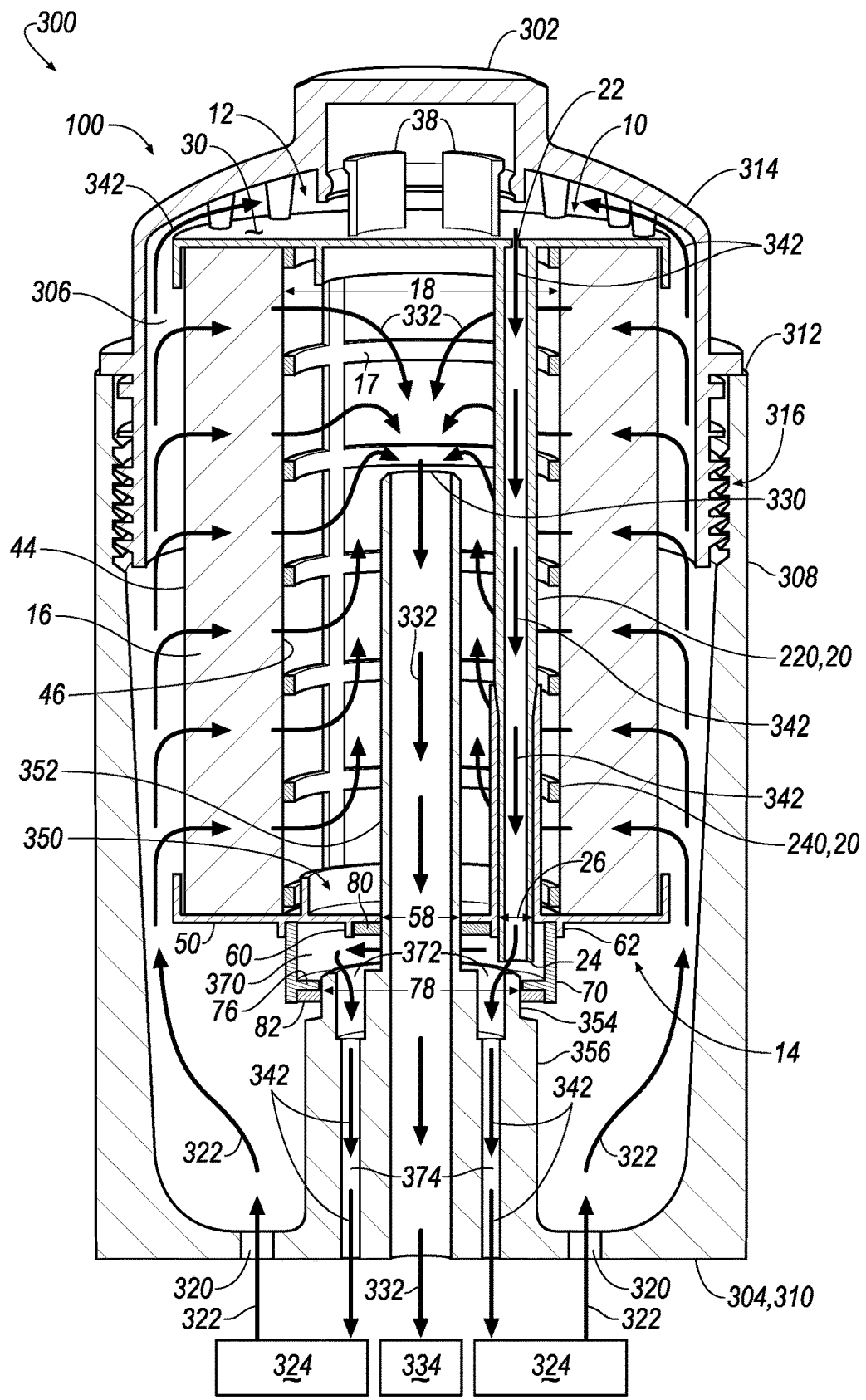
FIG. 3 is a schematic cross-sectional view of a filter assembly including a filter housing and the filter element of FIG. 1 disposed within the filter housing.

Referring to FIGS. 1 and 2, in some implementations, a filter element 10 for a fuel system includes a first end cap 12, a second end cap 14 opposing the first end cap 12, and a ring of filter media 16 disposed between the first end cap 12 and the second end cap 14 and circumscribing a central cavity 18. An air-bleed conduit 20 axially extends through the central cavity 18. Described in greater detail below with reference to FIG. 3, the air-bleed conduit 20 facilitates bleeding or venting of air residing within a filter housing 100 (FIG. 3). The accumulation of trapped air may cause the air to be pushed through the filter media 16, and thereby impact fuel delivery, and adversely affect performance of components downstream of the filter element 10. Accordingly, the air-bleed conduit 20 may vent trapped air out of the filter housing 100 for return back to a fuel supply, fuel reservoir, or the like 324 (FIG. 3). In some examples, the air-bleed conduit 20 includes a first portion 220 integrally formed with the first end cap 12 and a separate second portion 240 integrally formed with the second end cap 14. The first portion 220 and the second portion 240 are configured to fluidly connect with each other during assembly of the filter element 10 to form the air-bleed conduit 20 as a single member extending axially through the central cavity 18. In the views of FIGS. 1-3, the first end cap 12 is associated with the top end cap affixing to a top end of the filter media 16 and the second end cap 14 is associated with the bottom end cap affixing to a bottom end of the filter media 16 disposed on an opposite side of the filter media 16 than the top end. The filter media 16 may be formed from one or more materials having an efficiency and structure suitable for the particular application.

In some examples, the first end cap 12 includes an outer surface 30 and an inner surface 32 disposed on an opposite side of the end cap 12 than the outer surface 30. The first end cap 12 may include a first outer peripheral wall 34 and a first inner peripheral wall 36 disposed radially inward from the first outer peripheral wall 34. In some implementations, the inner surface 32 of the first end cap 12 affixes to the top end of the filter media 16 between the first outer peripheral wall 34 and the first inner peripheral wall 36. The inner surface 32 may affix and sealingly bond to the filter media 16 using potting compounds, such as Plastisol, urethanes, or other suitable adhesives. The first outer peripheral wall 34 extends axially downward or away from the first end cap 12 toward the second end cap 14 to outwardly bound an outer periphery 44 of the filter media 16. Similarly, the first inner peripheral wall 36 may extend axially downward or away from the first end cap 12 toward the second end cap 14 to inwardly bound an inner periphery 46 of the filter media 16. The first end cap 12 may also include one or more fastening members 38 projecting axially upward from the outer surface 30 for fastening the filter element 10 with the filter housing 100.

In some implementations, the first end cap 12 is integrally formed with the first portion 220 of the air-bleed conduit 20. The first end cap 12 and the first portion 220 may be generally, simultaneously formed from any conventional material, such as metal or plastic, during a single forming process (e.g., an injection molding process). The first portion 220 may extend axially between a first proximal end 222 disposed at the first end cap 12 and a first distal end 224 disposed closer to the second end cap 14 than the first end cap 12. The first proximal end 222 of the first portion 220 may define an inlet 22 formed through the outer surface 30 and the inner surface 32 of the first end cap 12. The inlet 22 may include an orifice having a size and shape configured to permit unfiltered air trapped axially above the outer surface 30 of the first end cap 12 to enter the first portion 220 of the air-bleed conduit 20, while preventing significant volumes of fluid from entering the air-bleed conduit 20 through the inlet 22. Additionally, a screen or other perforated material may cover the inlet 22 to block fluid and/or particulate matter from entering the air-bleed conduit 20 through the inlet 22. The first distal end 224 of the first portion 220 may define a first distal opening 24. The example of FIG. 1 shows the first distal end 224 of the first portion 220 extending through and protruding away from the second end cap 14. In this example, the first distal opening 24 directly fluidly communicates with the inlet 22 formed through the first end cap 22 to release air bled through the air-bleed conduit 20. In other examples, however, the first distal end 224 of the first portion 220 may terminate within the second portion 240 of the air-bleed conduit 20, and therefore, axially above the second end cap 14.

In some examples, the second end cap 14 includes an outer surface 50 and an inner surface 52 disposed on an opposite side of the second end cap 14 than the outer surface 50. The second end cap 14 may include a second outer peripheral wall 54 and a second inner peripheral wall 56 disposed radially inward from the second outer peripheral wall 54. In some implementations, the inner surface 52 of the second end cap 14 affixes to the bottom end of the filter media 16 between the second outer peripheral wall 54 and the second inner peripheral wall 56 on an opposite side of the filter media 14 than the first end cap 12. The inner surface 52 may affix and sealingly bond to the filter media 16 using potting compounds, such as Plastisol, urethanes, or other suitable adhesives. The second outer peripheral wall 54 extends axially upward or away from the second end cap 14 toward the first end cap 12 to outwardly bound the outer periphery 44 of the filter media 16. Similarly, the second inner peripheral wall 56 may extend axially upward or away from the second end cap 14 toward the first end cap 12 to inwardly bound the inner periphery 46 of the filter media 16. The second end cap 14 may also define a centrally located standpipe opening 58.

In some implementations, the second end cap 14 is integrally formed with the second portion 240 of the air-bleed conduit 20. The second end cap 14 and the second portion 240 may be generally, simultaneously formed from any conventional material, such as metal or plastic, during a single forming process (e.g., an injection molding process). The second portion 240 may extend axially between a second proximal end 242 disposed at the second end cap 14 and a second distal end 244 defining an inner opening 246. The second proximal end 242 may define an outer opening 26 formed through the outer surface 50 and the inner surface 52 of the second end cap 14. The examples of FIGS. 1-3 show the outer opening 26 having a size and shape configured to permit the first distal end 224 of the first portion 220 to extend therethrough. In other examples, when the first distal end 224 of the first portion 220 is disposed within the second portion 240 and axially above the second end cap 14, the outer opening 26 fluidly communicates with the inlet 22 formed through the first end cap 12 to release the air bled or vented through the air-bleed conduit 20.

The second end cap 14 may also include a first annular retaining wall 60 and a second annular retaining wall 62 each extending axially downward or away from the outer surface 50. The first annular retaining wall 60 may be disposed radially outward from the standpipe opening 58 and the second annular retaining wall 62 may be disposed radially outward from the first annular retaining wall 60. The outer opening 26 formed through the second end cap 14 may be disposed between the first annular retaining wall 60 and the second annular retaining wall 62.

In some implementations, an annular sealing device 70 is disposed on the outer surface 50 of the second end cap 14. The annular sealing device 70 may be integral to the second end cap 14 or separately attached. The sealing device 70 includes an outer surface 72 bounded by the second annular retaining wall 62 of the second end cap 14 and extending axially downward or away from the outer surface 50. An inner surface 74 of the annular sealing device 70 may include an inner lip 76 extending radially inward therefrom to define a sealing device opening 78. In some examples, a first annular seal 80 is disposed on the bottom surface 50 and bounded by the first annular retaining wall 60 to provide a seal between a standpipe assembly 350 (FIG. 3), the second end cap 14, and the sealing device 70 at the standpipe opening 58. A second annular seal 82 may be disposed axially below and in contact with the inner lip 74 of the annular sealing device 70. The second annular seal 82 may provide a seal between the standpipe assembly 350 and the annular sealing device 70 at the sealing device opening 78. Described in greater detail below with reference to FIG. 3, the standpipe assembly 350, the inner surface 74 of the sealing device 70, the first annular seal 80, the second annular seal 82, and the bottom surface 50 of the second end cap 14 may cooperate to define a vented air chamber 370 in direct fluid communication with the air-bleed conduit 20.

In some implementations, the filter element 10 optionally includes a support core 17 configured to support the filter media 16 at the inner periphery 46. The support core 17 may extend axially along the entire length of the filter media 16 and define a plurality of passages configured to allow filtered fuel 332 (FIG. 3) to flow into the central cavity 18 after passing through the filter media 16. The air-bleed conduit 20 may be separate from the support core 17 and disposed radially inward therefrom.

Referring to FIG. 2, an exploded view of the filter element 10 of FIG. 1 shows the first portion 220 of the air-bleed conduit 20 integrally formed with the first end cap 12 and the second portion 240 of the air-bleed conduit 20 integrally formed with the second end cap 14. A sum of the axial lengths of the first portion 220 and the second portion 240 may be greater than an axial distance between the first end cap 12 and the second end cap 14. In some examples, the first portion 220 includes an axial length greater than the axial distance between the first end cap 12 and the second end cap 14. However, in other examples (FIGS. 6 and 7), the axial length of the first portion 220 may be less than the axial distance between first end cap 12 and the second end cap 14.

The first portion 220 may include an outer surface 226 and an inner surface 228 that defines a passage for the flow of air between the inlet 22 and the first distal opening 24 (or the outer opening 26 formed through the second end cap 14). In some implementations, the outer surface 226 may include an exposed section 230 axially extending from the first proximal end 222, an insertion section 232 associated with the first distal end 224 and having an insertion diameter smaller than a diameter of the exposed section 230, and an intermediate frusto-conical section 234 interconnecting the exposed section 230 with the insertion section 232.

The second portion 240 may include an outer surface 247 and an inner surface 248 that defines a receiving passage 250 axially extending between the inner opening 246 and the outer opening 26 formed through the second end cap 14. The receiving passage 250 may receive the outer surface 226 of the first portion 220 to fluidly connect the first portion 220 and the second portion 240 together during assembly of the filter element 10, and thereby form the air-bleed conduit 20 as a single integral member extending axially through the central cavity 18 of the filter element 10. As used herein, the air-bleed conduit 20 extending axially through the central cavity 18 refers to the air-bleed conduit 20 extending axially through the inlet 22 formed through the first end cap 12, the central cavity 18, and the outer opening 26 formed through the second end cap 14.

The receiving passage 250 (FIG. 2) may include a uniform section 252 having a receiving diameter smaller than a diameter of the inner opening 246. In some examples, a frusto-conical tapered section 254 interconnects the inner opening 246 with the uniform section 252. During assembly of the filter element 10, the second end cap 14 may affix to the bottom end of the filter media 16 such that the second portion 240 of the air-bleed conduit 20 extends axially upward and into the central cavity 18. Prior to affixing the first end cap 12 to the top end of the filter media 16, the first portion 220 of the air-bleed conduit 20 must be positioned in coaxial alignment with the second portion 240 so that the insertion section 232 of the first portion 220 may be inserted into the receiving passage 250 of the second portion 240. Here, tapered edges of the frusto-conical tapered section 254 may assist in aligning and guiding the insertion section 232 of the first portion 220 into the receiving passage 250 to fluidly connect the first portion 220 and the second portion 240 together when the portions 220, 240 are axially pressed together. The first portion 220 and the second portion 240 may fluidly connect together by a compression fit and/or other fastening members associated with the first and second portions 220 and 240.

In some implementations, the frusto-conical tapered section 254 of the receiving passage 250 includes a geometry configured to receive and seal against the intermediate frusto-conical section 234 of the outer surface 226 of the first portion 220 to fluidly connect the first portion 220 and the second portion 240 when the uniform section 252 of the receiving passage 250 receives the insertion section 232 of the first portion 220. FIGS. 1 and 3 show the first portion 220 and the second portion 240 fluidly connected such that the frusto-conical tapered section 254 and the intermediate frusto-conical section 234 form a seal with the first distal end 224 defining the first distal opening 24 extending through the outer opening 26 formed through the second end cap 14. Accordingly, the first distal opening 24 directly fluidly communicates with the inlet 22 formed through the first end cap 12 to release the air bled or vented through the air-bleed conduit 20. In other implementations, the first distal end 224 defining the first distal opening 24 may terminate within the receiving passage 250 of the second portion 240, and thus, axially above the first end cap 14. In these implementations, the first distal opening 24 provides fluid communication between the inlet 22 formed through the first end cap 12 and the outer opening 26 formed through the second end cap 14 to release the air bled or vented through the air-bleed conduit 20.

In some implementations, the geometry of the first portion 220 and the second portion 240 may be reversed without limitation to allow the inner surface 228 of the first portion 220 to define a receiving passage 750 (FIG. 7) configured to receive the outer surface 247 of the second portion 240, and thereby fluidly connect the first portion 220 and the second portion 240 together. Here, the inner opening 246 of the second portion 240 may be disposed within the receiving passage 750 of the first portion 220.

In other configurations, rather than being integrally formed with respective ones of the first end cap 12 or the second end cap 14, at least one of the first portion 220 or the second portion 240 of the air-bleed conduit 20 may be formed independently from the respective one of the first end cap 12 or the second end cap 14. For instance, the first end cap 12 may be formed to define the inlet 22 therethrough and the first proximal end 222 of the first portion 220 may be mounted or attached to the inner surface 32 of the first end cap 12. Similarly, the second end cap 14 may be formed to define the outer opening 26 therethrough and the second proximal end 242 of the second portion 240 may be mounted or attached to the inner surface 52 of the second end cap 14.

Referring to FIG. 3, in some implementations, a filter assembly 300 includes the filter housing 100 and the filter element 10 cooperating to remove particulates from a fuel stream in a fuel system. For example, the filter assembly 300 may be located downstream, on a pressure side of a fuel supply 324 (e.g., a pump and/or fuel tank) for moving fuel through the system, e.g., from the fuel tank to an engine 334.

The filter housing 100 (hereinafter 'housing') defines an internal chamber 306 between a first end 302 and a second end 304, and the filter element 10 is received within the internal chamber 306. The housing 100 may include a cylindrical canister 308 having a bottom, closed end 310 associated with the second end 304 of the housing 100, and a top, open end 312. A cover 314 may attach to the open end 312 of the canister 308 to define the internal chamber 306 of the housing 100. Threads 316 may be provided between the canister 308 and the cover 314 to allow the cover 314 to be releasably fastened to the canister 308. The canister 308 may define one or more inlet fuel ports 320 to direct unfiltered fuel 322 from the fuel supply 324 into the internal chamber 306 of the housing 100 to be filtered. The fuel supply 324 may include a fuel tank and/or a fuel pump.

In some implementations, the standpipe assembly 350 is at least partially disposed within the internal chamber 306 of the housing 100. The standpipe assembly 350 includes an elongated standpipe member 352 centrally located within the housing 100 and axially extending upward or away from the bottom second end 304 of the housing 100 and through the standpipe opening 58 formed through the second end cap 14. The standpipe member 352 includes a distal end terminating within the central cavity 18 of the filter element 10 that defines a fuel outlet port 330 for directing filtered fuel 332 upon passing through the filter media 16. The fuel outlet port 330 directs the filtered fuel 332 out of the housing 100 to the engine 334 downstream of the filter assembly 300. Accordingly, the unfiltered fuel 322 is received by the internal chamber 306 of the housing 308 through the one or more inlet ports 320 and the unfiltered fuel 322 may pass through the filter media 16 at the outer periphery 44 and exit the inner periphery 46 as filtered fuel 332 within the central cavity 18. In some examples, the support core 17 is disposed within the central cavity 18 and supports the inner periphery 46 of the filter media 16. The support core 17 may be formed from cross-members defining a plurality of passages configured to allow the filtered fuel 332 to flow into the central cavity 18 and exit the filter assembly 300 through the outlet port 330 of the standpipe member 352 after passing through the filter media 16.

As the unfiltered fuel 322 rises within the internal chamber 306 toward the first end 314 of the housing 100 during operation of the fuel system (e.g., the fuel supply 324, the filter assembly 300, and the engine 334), air 342 may be pushed axially upward in the internal chamber 308 and may become trapped between the outer surface 30 of the first end cap 12 and the first end 314 of the housing 100. The air-bleed conduit 20 extending axially through the internal cavity 18 may bleed or vent the trapped air 342 out of the housing 100 and back to the fuel supply 324 so that the air 342 is not pushed through the filter media 16 and delivered to the engine 334 via the fuel outlet port 330. Specifically, the air-bleed conduit 20 may receive the trapped air 342 through the inlet 22 and direct the trapped air 342 out of the first distal opening 24 disposed axially below the second end cap 14 and into the vented air chamber 370. Optionally, the trapped air 342 may exit through the outer opening 26 and into the vented air chamber 370 when the first distal opening 24 of the first portion 220 is disposed axially above the second end cap 14.

The vented air chamber 370 may be defined by the standpipe assembly 350, the outer surface 50 of the second end cap 14, the annular sealing device 70, the first annular seal 80 and the second annular seal 82. In some examples, the standpipe assembly 350 includes a frusto-conical tapered portion 354 that interconnects the elongated standpipe member 352 with a base member 356 having a larger diameter than the standpipe member 352. FIG. 3 shows the frusto-conical tapered portion 352 partially received by the sealing device opening 78 and sealed by the second annular seal 82 to define the vented air chamber 370.

In some implementations, the standpipe assembly 350 defines one or more air return ports 374 fluidly separate from the fuel outlet port 330 and configured to return the air 342 vented through the air-bleed conduit 20 back to the fuel supply 324. The air return ports 374 may extend from air openings 372 along the length of the standpipe assembly 350 to the fuel supply 324 disposed outside of the housing 100. The air openings 372 may be formed through the frusto-conical tapered portion 352 of the standpipe assembly 350. Accordingly, unfiltered trapped air 342 within the housing 100 may vent or bleed through the air-bleed conduit 20 and into the vented air chamber 370 for return back to the fuel supply 324 via the one or more air return ports 374.

Figure 4:
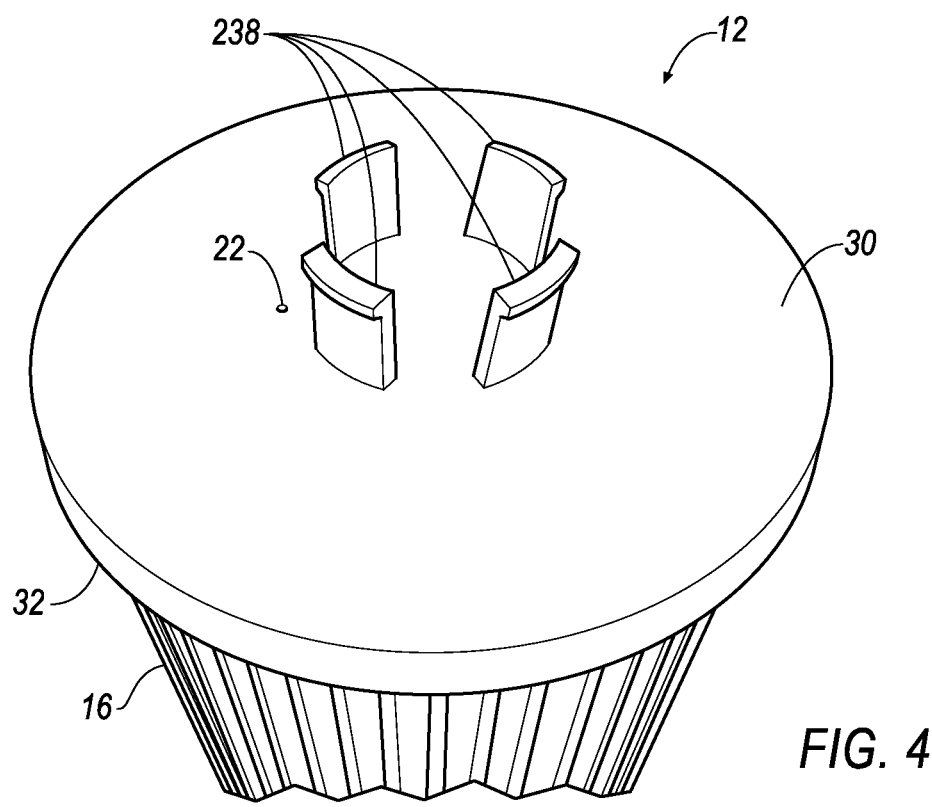
FIG. 4 is a top perspective view of a top end cap of the filter element of FIG. 1 defining an inlet of the air-bleed conduit formed therethrough.
Figure 5:
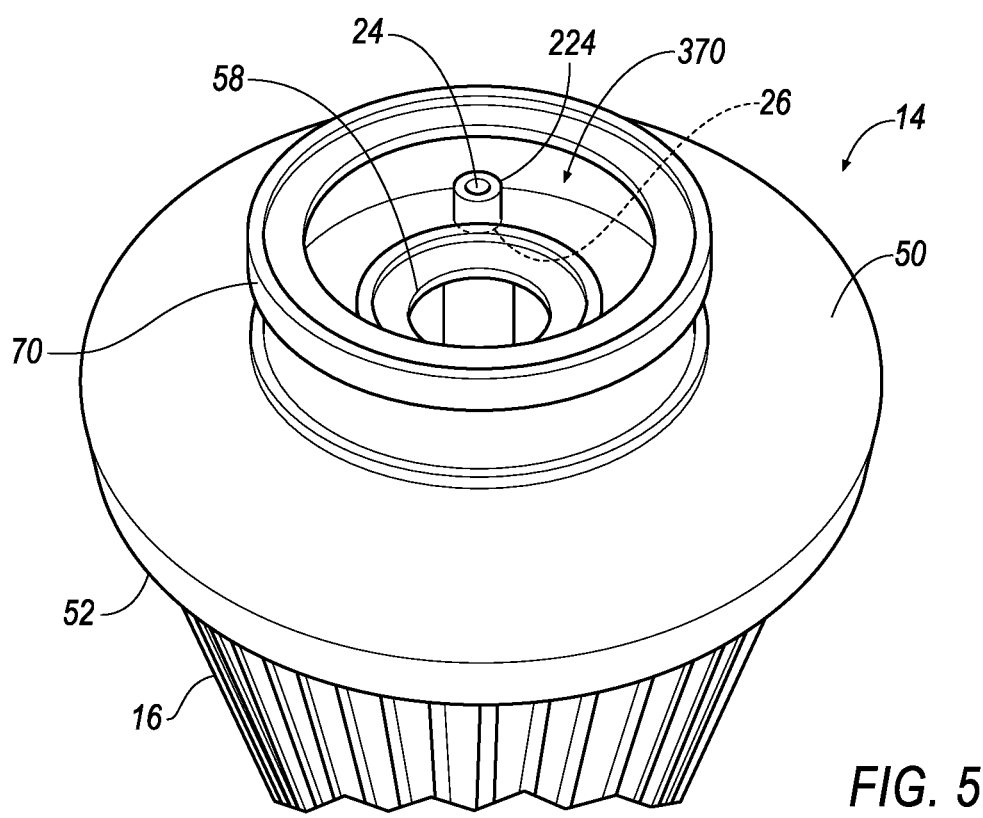
FIG. 5 is a bottom perspective view of a bottom end cap of the filter element of FIG. 1 showing a first distal end of the air-bleed conduit defining a first distal opening that extends through an outer opening formed through the bottom end cap.

FIGS. 4 and 5 provide a top perspective view (FIG. 4) of the first end cap 12 and a bottom perspective view (FIG. 5) of the second end cap 14 for the filter element 10 of FIGS. 1-3. FIG. 4 shows the outer surface 30 of the first end cap 12 (e.g., the top end cap relative to the views of FIGS. 1-3) including the one or more fastening members 38 projecting axially upward and the inlet 22 of the air-bleed conduit 20 formed through the first end cap 12. The inlet 22 is located radially inward from the ring of filter media 16. The inner surface 32 of the first end cap 12 is affixed to the first or top end of the filter media 16.

FIG. 5 shows the outer surface 50 of the second end cap 14 (e.g., the bottom end cap relative to the views of FIGS. 1-3) having the annular sealing device 70 disposed thereon and the inner surface 52 of the second end cap 14 affixed to the second or bottom end of the filter media 16. The standpipe opening 58 and the outer opening 26 associated with the second portion 240 of the air-bleed conduit 20 are both formed through the second end cap 14. The vented air chamber 370 is defined between the annular sealing device 70 and the outer surface 50 of the second end cap 14 when the standpipe assembly 350 (not shown) is received by the sealing device 70 and the filter element 10. The first distal end 224 of the first portion 220 of the air-bleed conduit 20 may extend through the outer opening 26 formed through the second end cap 14. Here, the first distal opening 24 defined by the first distal end 224 is disposed axially away from the outer surface 50 within the vented air chamber 370. When the filter element 10 is assembled and the first portion 220 and the second portion 240 are connected (as shown in FIG. 3), a fluid tight seal is created and the inlet 22 formed through the first end cap 12 (FIG. 4), the outer opening 26 formed through the second end cap 14, and the first distal opening 24 of the first portion 220 may be generally coaxial with each other.

Figure 6:
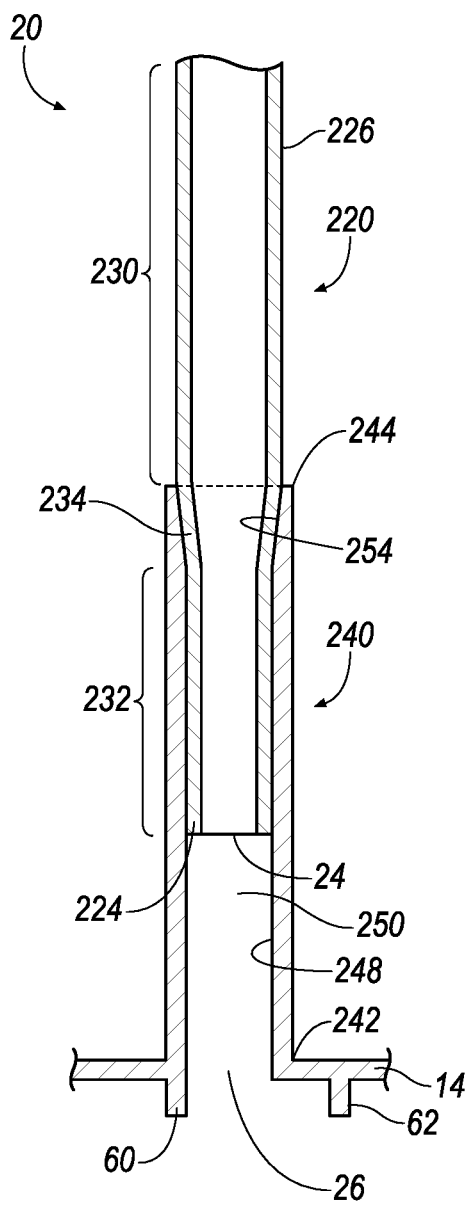
FIG. 6 is a detailed schematic view enclosed within area 6, 7 of FIG. 1 showing a second portion of the air-bleed conduit receiving a first portion of the air-bleed conduit to fluidly connect the first portion and the second portion together.

Referring to FIG. 6, in some implementations, the first portion 220 and the second portion 240 of the air-bleed conduit 20 fluidly connect together to form the air-bleed conduit 20 when the receiving passage 250 of the second portion 240 receives the insertion section 232 of the outer surface 226 of the first portion 220. Optionally, the fluid connection is substantially a fluid tight connection. Accordingly, the first portion 220 may correspond to a male portion and the second portion 240 may correspond to a female portion. Conversely to the examples of FIGS. 1-3 showing the first distal end 224 of the first portion 220 extending through the outer opening 26 formed through the second end cap 14, FIG. 6 shows the first distal end 224 of the first portion 220 disposed within the receiving passage 250 of the second portion 240. In this example, the first distal opening 24 defined by the first distal end 224 of the first portion 220 provides fluid communication between the inlet 22 formed through the first end cap 12 (neither shown) and the outer opening 26 formed through the second end cap 14. As described in the foregoing, the frusto-conical tapered section 254 of the second portion 240 and the intermediate frusto-conical section 234 of the first portion 220 may cooperate to form a seal, and thereby fluidly connect the first portion 220 and the second portion 240 together, such that air and/or filtered fuel 332 within the central cavity 18 is prevented from entering the air-bleed conduit 20. The geometry of the first portion 220 and the second portion 240 may be reversed without departing from the scope of the present disclosure.

Figure 7:
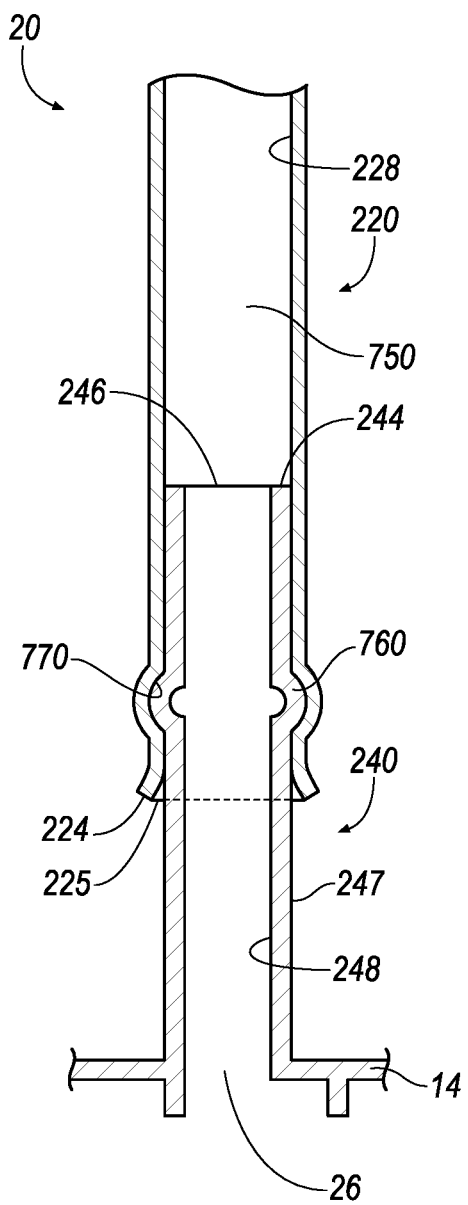
FIG. 7 is a detailed schematic view within area 6, 7 of FIG. 1 showing various alternative embodiments of a first portion of the air-bleed conduit receiving a second portion of the air-bleed conduit to fluidly connect the first portion and the second portion together.

Referring to FIG. 7, in some implementations, the inner surface 228 of the first portion 220 defines a receiving passage 750 configured to receive the outer surface 247 of the second portion 240. In these implementations, the first portion 220 and the second portion 240 fluidly connect together to form the air-bleed conduit 20 when the receiving passage 750 of the first portion 220 receives the outer surface 247 of the second portion 240. In some examples, the first distal end 224 of the first portion 220 slants radially outward to assist with guiding the second proximal end 244 of the second portion 240 into the receiving passage 750. Additionally, slanting the first distal end 224 of the first portion 220 radially outward helps prevent the first distal end 224 and the second distal end 244 from interfering with each other in a manner that would inhibit the ability of the receiving passage 750 to receive the outer surface 247 of the second portion 240 during assembly of the filter element 10. The first distal end 224 may be formed from a compressible and resilient material at location 225 to enable the first distal end 224 to flex or compress radially outward in the event the first distal end 224 contacts the second distal end 244 of the second portion 224 when the second distal end 244 inserts into the receiving passage 750.

In some implementations, one or more interference members 760 protrude from the outer surface 247 of the second portion 240 and one or more receiving slots 770 are formed within the inner surface 228 of the receiving portion 750. In these implementations, the receiving slots 770 receive corresponding ones of the interference members 760 to prevent the first portion 220 and the second portion from moving relative to each other when the receiving passage 750 receives the outer surface 247 of the second portion 240. In other words, the interference members 760 and the receiving slots 770 may engage with each other to prevent the first portion 220 and the second portion 240 from fluidly disconnecting. Additionally, the interference members 760 and the receiving slots 770 may cooperate to provide a seal within the receiving passage 750 between the inner surface 228 of the first portion 220 and the outer surface 247 of the second portion 240. In other implementations, the one or more interference members 760 protrude from the inner surface 228 of the receiving passage 750 and the one or more corresponding receiving slots 770 are formed within the outer surface 247 of the second portion 240. The interference members 760 and receiving slots 770 may also be incorporated to the air-bleed conduit 20 in the examples of FIGS. 1-3 and 6.

A number of implementations have been described. Nevertheless, it will be understood that various modifications may be made without departing from the spirit and scope of the disclosure. Accordingly, other implementations are within the scope of the following claims.

What is claimed is:

1. A filter element comprising:
   a first end cap;
   a second end cap;
   a ring of filter media disposed between the first end cap and the second end cap, the ring of filter media defining a central cavity; and
   an air-bleed conduit axially extending through the central cavity and including a first portion integrally formed with the first end cap and a second portion integrally formed with the second end cap, said second portion configured to connect to the first portion thereby forming a conduit for transmitting fluid.

2. The filter element of claim 1, wherein a sum of axial lengths of the first portion and the second portion is greater than an axial distance between the first end cap and the second end cap.

3. The filter element of claim 1, wherein the first portion includes an axial length greater than an axial distance between the first end cap and the second end cap.

4. The filter element of claim 1, wherein the second portion fluidly connects to the first portion when a receiving passage defined by an inner surface of one of the first portion or the second portion receives an outer surface of the other one of the first portion or the second portion.

5. The filter element of claim 4, wherein:
   the first portion axially extends from an inlet formed through the first end cap to a first distal end defining a distal opening in fluid communication with the inlet; and
   the receiving passage is defined by the inner surface of the second portion that axially extends between an outer opening formed through the second end cap and an inner opening defined by a second distal end of the second portion, wherein the first distal end of the first portion is disposed within the receiving passage of the second portion or axially extends through the outer opening formed through the second end cap when the first portion and the second portion are fluidly connected.

6. The filter element of claim 5, wherein:
   the outer surface of the first portion includes an exposed section axially extending from the first end cap, an insertion section at the first distal end and having an insertion diameter smaller than a diameter of the exposed section, and an intermediate frusto-conical section interconnecting the exposed section with the insertion section; and
   the receiving passage includes a frusto-conical tapered section interconnecting the inner opening of the receiving passage with a uniform section of the receiving passage having a receiving diameter smaller than a diameter of the inner opening and greater than the insertion diameter of the insertion section of the first portion.

7. The filter element of claim 6, wherein the frusto-conical tapered section of the receiving passage includes a geometry configured to receive and seal against the intermediate frusto-conical section of the outer surface of the first portion to fluidly connect the second portion to the first portion when the uniform section of the receiving passage receives the insertion section of the first portion.

8. The filter element of claim 4, wherein:
   the first portion axially extends from an inlet formed through the first end cap to a first distal end defining a first distal opening in fluid communication with the inlet, and the inner surface of the first portion defines the receiving passage extending axially from the first distal opening toward the inlet; and the second portion axially extends from an outer opening formed through the second end cap to a second distal end, the second distal end disposed within the receiving passage of the first portion and defining an inner opening in fluid communication with the inlet formed through the first end cap and the outer opening formed through the second end cap when the first portion and the second portion are fluidly connected.

9. The filter element of claim 8, further comprising:
one or more interference members protruding radially inward from the inner surface of the first portion or protruding radially outward from the outer surface of the second portion; and
one or more receiving slots formed within the other one of the inner surface of the first portion or the outer surface of the second portion and configured to receive corresponding ones of the interference members to prevent the first portion and the second portion from moving relative to each other when the receiving passage of the first portion receives the outer surface of the second portion.

10. The filter element of claim 9, wherein the one or more interference members and the corresponding one or more receiving slots cooperate to provide a seal within the receiving passage between the inner surface of the first portion and the outer surface of the second portion.

11. The filter element of claim 1, further comprising:
a support core disposed in the central cavity of the filter media and supporting an inner periphery of the filter media, wherein the air-bleed conduit is disposed radially inward from the support core.

12. A filter assembly comprising:
a filter housing defining an internal chamber between a first end and a second end; and
a filter element disposed within the internal chamber of the filter housing, the filter element comprising:
 a first end cap opposing the first end of the filter housing;
 a second end cap opposing the second end of the filter housing;
 a ring of filter media axially extending between the first end cap and the second end cap;
 a male portion of an air-bleed conduit having a first proximal end integrally formed with the first end cap to define an inlet formed through the first end cap; and
 a female portion of the air-bleed conduit fluidly connected to the male portion and having a second proximal end integrally formed with the second end cap to define an outer opening formed through the second end cap.

13. The filter assembly of claim 12, wherein the male portion and the female portion are coaxial and disposed radially inward from an inner periphery of the filter media.

14. The filter assembly of claim 12, wherein the female portion defines a receiving passage axially extending between the outer opening and an inner opening disposed between the first end cap and the second end cap, the receiving passage receiving and forming a seal with an outer surface of the male portion.

15. The filter assembly of claim 14, wherein the male portion axially extends from the first proximal end to a first distal end disposed within the receiving passage of the female portion, the first distal end defining a first distal opening that provides fluid communication between the inlet formed through the first end cap and the outer opening formed through the second end cap.

16. The filter assembly of claim 14, wherein the male portion includes a first distal end axially extending through the receiving passage of the female portion from the first proximal end, the first distal end defining a first distal opening disposed between the second end cap and the second end of the filter housing and in fluid communication with the inlet formed through the first end cap.

17. The filter assembly of claim 14, further comprising:
one or more interference members protruding from one of the outer surface of the male portion or the inner surface of the receiving portion; and
one or more receiving slots formed within the other one of the outer surface of the male portion or the inner surface of the receiving portion and configured to receive corresponding ones of the interference members to prevent the male portion and the female portion from moving relative to each other.

18. A method of manufacturing a filter element comprising:
integrally forming a first end cap with a first portion of an air-bleed conduit, the first portion axially extending from an inlet formed through the first end cap to a first distal end defining a first distal opening;
integrally forming a second end cap with a second portion of the air-bleed conduit, the second portion axially extending from an outer opening formed through the second end cap to a second distal end defining an inner opening;
providing a ring of filter media circumscribing a central cavity and extending axially between a first end a second end;
affixing one of the second end cap to the second end of the filter media or the first end cap to the first end of the filter media;
connecting the first portion and the second portion of the air-bleed conduit together thereby forming a fluid tight connection; and
affixing the other one of the first end cap to the first end of the filter media or the second end cap to the second end of the filter media.

19. The method of claim 18, wherein the step of fluidly connecting the first portion and the second portion of the air-bleed conduit together comprises:
when the second end cap is affixed to the second end of the filter media with the second portion of the air-bleed conduit extending axially into the central cavity:
 positioning the first end cap to place the first portion of the air-bleed conduit in coaxial alignment with the second portion of the air-bleed conduit;
 inserting one of the first distal end of the first portion into the inner opening of the second portion or the second distal end of the second portion into the first distal opening of the first portion; and
 pressing the first portion and the second portion of the air-bleed conduit together to form a seal between an outer surface of the first portion and an inner surface of the second portion or between an inner surface of the first portion and an outer surface of the second portion.

20. The method of claim 19, wherein the inlet formed through the first end cap directly fluidly communicates with one of:

the first distal opening of the first portion of the air-bleed conduit when the first distal end of the first portion extends through the outer opening formed through the second end cap; or the outer opening formed through the second end cap when the first distal end of the first portion is disposed between the inner opening of the second portion and the outer opening.

\* \* \* \* \*